United States Patent
Yeh

(10) Patent No.: US 9,219,380 B2
(45) Date of Patent: Dec. 22, 2015

(54) BYPASS CONTROL BIDIRECTIONAL WIRELESS CHARGING DEVICE

(71) Applicant: Ming-Hsiang Yeh, Taipei (TW)

(72) Inventor: Ming-Hsiang Yeh, Taipei (TW)

( * ) Notice: Subject to any disclaimer, the term of this patent is extended or adjusted under 35 U.S.C. 154(b) by 237 days.

(21) Appl. No.: 14/086,056

(22) Filed: Nov. 21, 2013

(65) Prior Publication Data

US 2014/0152249 A1    Jun. 5, 2014

(30) Foreign Application Priority Data

Nov. 30, 2012    (TW) .............................. 101223192 U

(51) Int. Cl.
*H02J 7/02* (2006.01)
(52) U.S. Cl.
CPC ...................................... *H02J 7/025* (2013.01)
(58) Field of Classification Search
CPC ....................................................... H02J 7/025
See application file for complete search history.

(56) References Cited

U.S. PATENT DOCUMENTS

| | | | | |
|---|---|---|---|---|
| 6,693,393 | B2 * | 2/2004 | Konishi | H05B 41/2881 315/224 |
| 8,698,450 | B2 * | 4/2014 | Yeh | H02J 7/025 320/108 |
| 9,118,193 | B2 * | 8/2015 | Yeh | H02J 7/0029 1/1 |
| 2014/0152248 | A1 * | 6/2014 | Yeh | H02J 7/025 320/108 |

* cited by examiner

*Primary Examiner* — Naum B Levin
(74) *Attorney, Agent, or Firm* — Bacon & Thomas, PLLC

(57) ABSTRACT

A bypass control bidirectional wireless charging device provides bidirectional charging mode, in which includes a logic control unit electrically connected to a wireless transmission unit, a full-bridge inverter, a buck-boost unit, a discharging switch unit, a back current prevention unit and a selective switch unit. While the wireless discharging mode started, the discharging switch unit turned on and the battery provided the transmitting power. While the back current prevention device connected to an external power, the discharging switch unit turned off and the back current prevention device turned off to provide the transmitting power by the battery. While the wireless charging mode started, the handheld devices or the loadings were charged by the wireless charging to achieve the purpose of increasing the effective duration of the battery and the electricity efficiency.

18 Claims, 2 Drawing Sheets

BYPASS CONTROL BIDIRECTIONAL WIRELESS CHARGING DEVICE

FIELD OF THE INVENTION

The present invention relates to a bypass control bidirectional wireless charging device, and in particular to a bypass control bidirectional wireless charging device has bidirectional charging mode. While the back current prevention device connects to an external power, the discharging switch unit turns off and the back current prevention device turns off to provide the transmitting power by the battery. While the wireless charging mode starts, the handheld devices or the loadings are charged by the wireless charging to achieve the purpose of increasing the effective duration of the battery and the electricity efficiency.

BACKGROUND OF THE INVENTION

In the future, the wireless charging will be used everywhere with the growing popularity of the wireless charging. Although it is convenient to use the wireless charging everywhere, but the surge which generated from the initial charging by both of the wire or wireless charging may cause the cumulative damage to the battery to cumulatively reduce effective duration of the battery. In other words, the effective duration of the battery is reducing with the increasing numbers of charging, and the efficiency of discharging/charging of the battery becomes worse and worse. However, the conventional wireless charging device only has fixed directional charging, such as one way wireless charging or one way wireless discharging. Therefore, a bidirectional wireless charging is provided to transform the power bi-direction and exchanges the transmitting to receiving or receiving to transmitting. But the efficiency of bidirectional charging devices with battery is not good enough. Thus, the conventional directional or bidirectional wireless charging devices provide the transmitting power by the battery which causes the reducing of the effective duration of the battery and the low electricity transmitting efficiency.

Thus, it is desired to provide a bypass control bidirectional wireless charging device which has the bidirectional charging mode. While the wireless discharging mode starts, the transmitting power is provided by the battery of the external power. While the wireless charging mode starts, the handheld devices or the loadings are charged by the wireless charging to achieve the purpose of increasing the effective duration of the battery and the electricity efficiency.

SUMMARY OF THE INVENTION

A main aspect of the present invention is to provide a bypass control bidirectional wireless charging device which has bidirectional charging mode, while the discharging mode is adopted and connects to an external power, the power is supplied by the external power and departed from the battery. While the charging mode is adopted without the external power and the battery provides the power to the wireless transmitting unit automatically.

To achieve the above aspect, the present invention provides a bypass control bidirectional wireless charging device, which comprises a logic control unit, a wireless transmission unit electrically connects to the logic control unit, a full-bridge inverter electrically connects to the logic control unit and the wireless transmission unit, a buck-boost unit electrically connects to the full-bridge inverter and the logic control unit, a discharging switch unit has a battery terminal, a signal terminal, and output terminal, wherein the signal terminal electrically connects to the logic control unit and the output terminal electrically connecting to the buck-boost unit, a battery electrically connects to the battery terminal of the discharging switch unit, a switch electrically connects to the battery terminal with one end thereof, and the other end of the switch electrically connects to the signal terminal across a first diode, and a back current prevention unit, having a inlet terminal, a outlet terminal and a control terminal, wherein the inlet terminal electrically connecting to one end of a first resistance and a charging terminal, the other end of the first resistance electrically connecting to the logic control unit and one end of a second resistance and the other end of the second resistance is grounding, the outlet terminal electrically connecting to the discharging switch unit and the buck-boost unit therebetween, and the control terminal electrically connecting to the logic control unit, and a selective switch unit has a selective connecting terminal, a selective output terminal, and a selective control terminal, wherein the selective connecting terminal electrically connecting to the outlet terminal of the back current prevention unit, the output terminal of the discharging switch unit, and the buck-boost unit, and the selective control terminal electrically connecting to the logic control unit.

While the wireless charging mode started and the back current prevention unit connects to a handheld device and the selective switch unit connects to a loading, the back current prevention unit and the selective switch unit are turned on by the logic control unit to transform the alternating current which received by the wireless transmitting unit to the direct current by the full-bridge converter. Then set down the voltage of the direct current by the buck-boost unit. The buck direct current goes through the back current prevention unit and the selective switch unit to charge the handheld device and the loading to achieve the purpose of wireless charging. Therefore, the bypass control bidirectional wireless charging device of present invention has the bidirectional charging mode. While the wireless discharging mode starts, the transmitting power is provided by the battery of the external power. While the wireless charging mode starts, the handheld devices or the loadings are charged by the wireless charging to achieve the purpose of increasing the effective duration of the battery and the electricity efficiency.

BRIEF DESCRIPTION OF THE DRAWINGS

The present invention will be apparent to those skilled in the art by reading the following description of preferred embodiments thereof with reference to the drawings, in which.

DETAILED DESCRIPTION OF THE PREFERRED EMBODIMENTS

Figure 1:
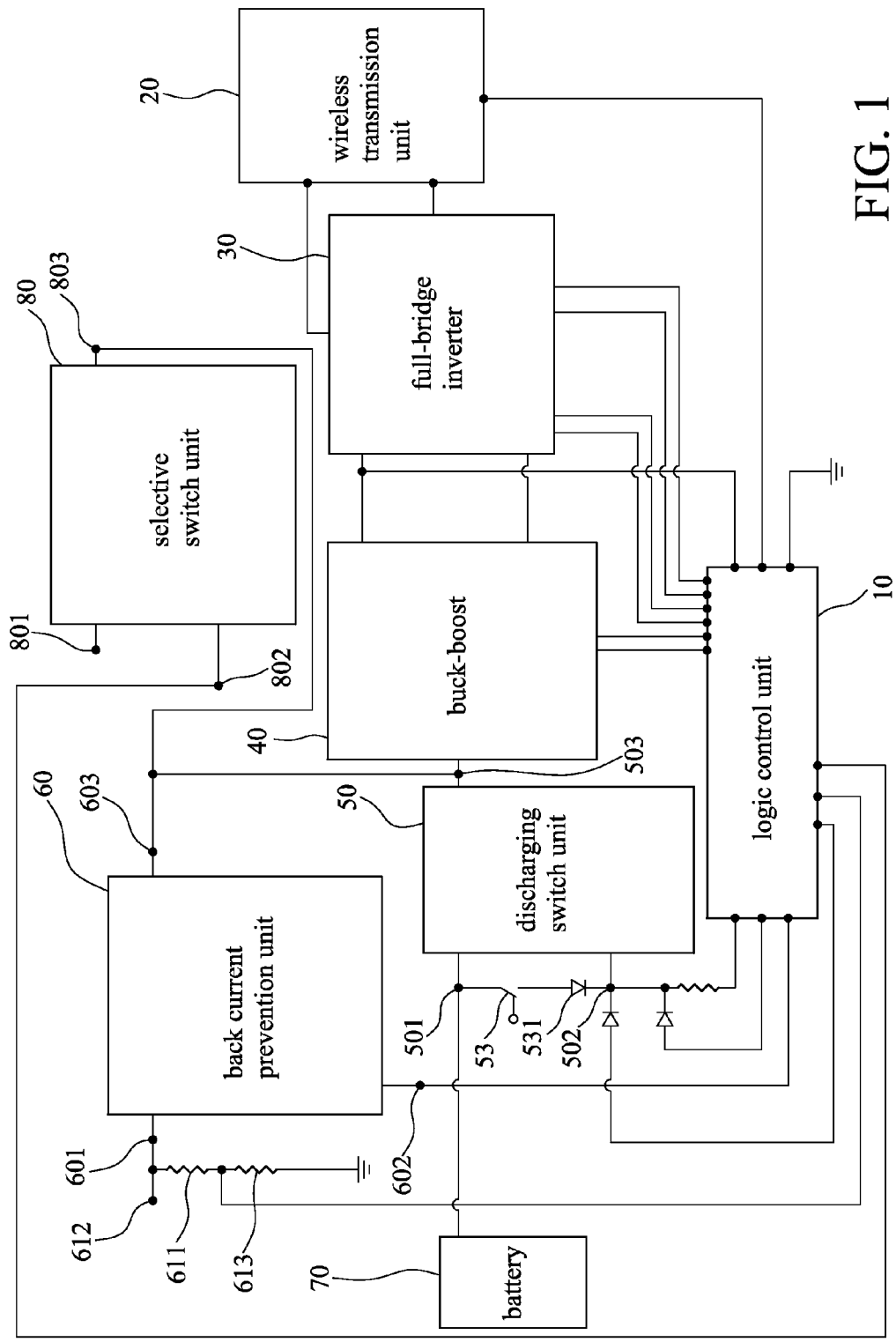
FIG. 1 is a block diagram of an embodiment of the present invention.
Figure 2:
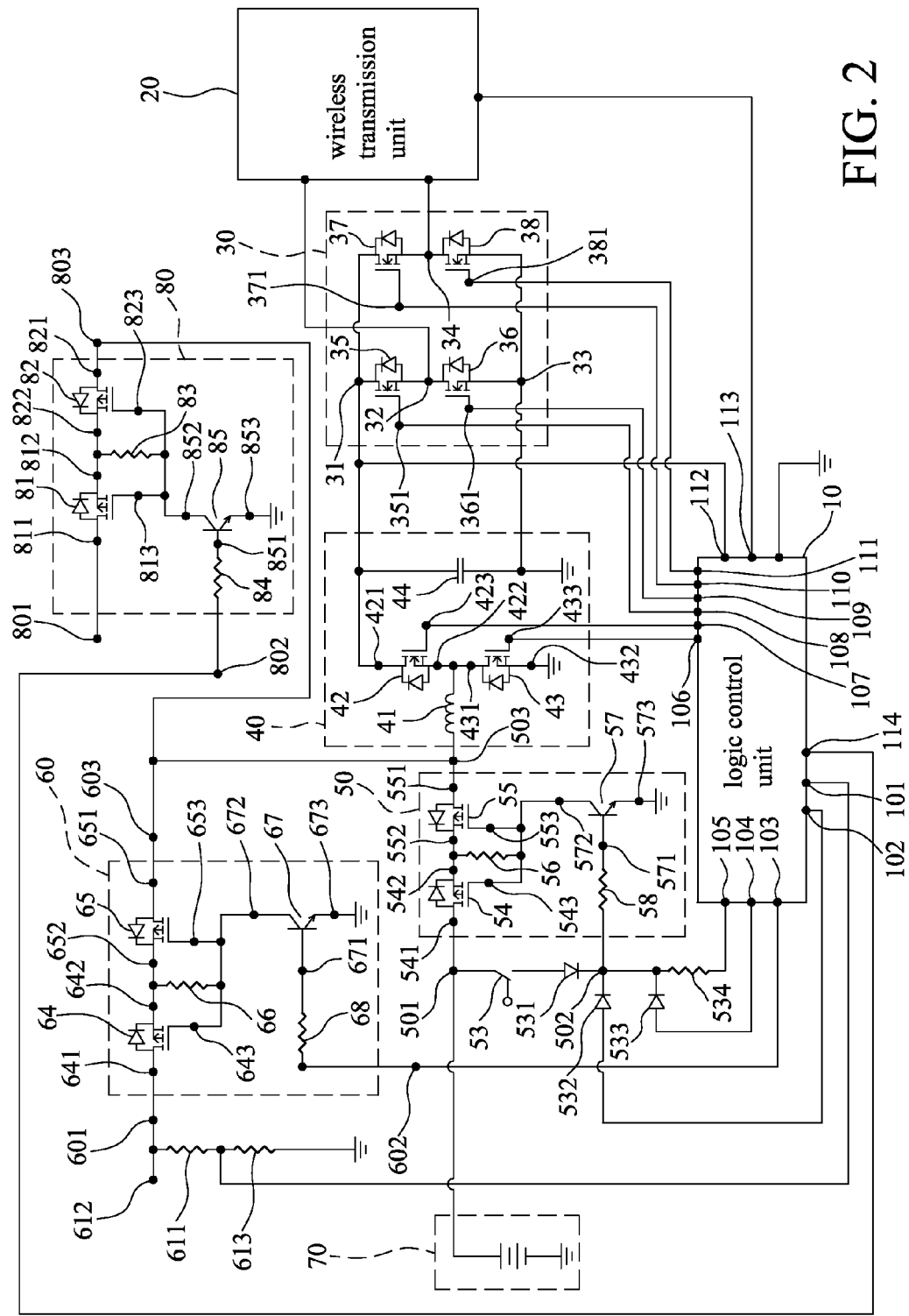
FIG. 2 is a circuit schematic diagram of an embodiment of the present invention.

With reference to the drawings and in particular to FIG. 1-2, the present invention is a bypass control bidirectional wireless charging device, which comprises a logic control unit 10, a wireless transmission unit 20, a full-bridge inverter 30, a buck-boost unit 40, a discharging switch unit 50, a battery 70, a switch 53, a back current prevention unit 60, and a selective switch unit 80. The wireless transmission unit 20 electrically connects to the logic control unit 10. The full-bridge inverter 30 electrically connects to the logic control unit 10 and the wireless transmission unit 20. The buck-boost unit 40 electrically connects to the full-bridge inverter 30 and the logic control unit 10. The discharging switch unit 50 has a battery terminal 501, a signal terminal 502, and an output terminal 503, wherein the signal terminal 502 electrically connects to the logic control unit 10 and the output terminal 503 electrically connects to the buck-boost unit 40. The battery terminal 501 connects to the battery 70. One end of the switch 53 electrically connects to the battery terminal 501 and the other end of the switch 53 electrically connects to the signal terminal 502 across a first diode 531, wherein the switch 53 is an automatic self-reset switch in the present embodiment. The back current prevention unit 60 has a inlet terminal 601, a outlet terminal 603 and a control terminal 602, wherein the inlet terminal 601 electrically connects to one end of a first resistance 611 and a charging terminal 612, and the charging terminal 612 of the back current prevention 60 unit further electrically connects to an external power in the present embodiment (not shown in figures). The other end of the first resistance 611 electrically connects to the logic control unit 10 and one end of a second resistance 613 and the other end of the second resistance 613 is grounding. The outlet terminal 603 electrically connects to the discharging switch unit 50 and the buck-boost unit 40 therebetween, and the control terminal 602 electrically connects to the logic control unit 10. The selective switch unit 80 has a selective connecting terminal 803, a selective output terminal 801, and a selective control terminal 802, wherein the selective connecting terminal 803 electrically connecting to the outlet terminal 603 of the back current prevention unit 60, and the output terminal 503 of the discharging switch unit 50, and the buck-boost unit 40, and the selective control terminal 802 electrically connects to the logic control unit 10. Furthermore, the selective output terminal 801 of the selective switch unit 80 further connects to a loading (not shown in figures).

While the discharging mode is adopted and the charging terminal 60 of the back current prevention unit 60 connects to the external power(not shown in the figure), the back current prevention unit 60 is turned on by the logic control unit 10 to turn off the discharging switch unit 50. The voltage of the external power is boosted by the buck-boost unit 40, and then the direct current transforms into alternating current by the full-bridge inverter 30. The coil of the wireless transmission unit 20 induces the alternating current to generate the transmitting power to the electronics at the opposite side to achieve the purpose of wireless charging. In other words, while an external power is connected and the external charging mode is adopted, the power is depart from the battery. On the contrary, the battery charging mode is adopted without the external power to provide the transmitting power from the battery 70 to the wireless transmission unit 20 automatically. While charging mode is adopted and the back current prevention unit 60 connects to a handheld device (not shown in Figures) and the selective switch unit 80 connects to a loading (not shown in Figures), the back current prevention unit 60 and the selective switch unit 80 are turned on by the logic control unit 10 to transform the alternating current which receive from the wireless transmission unit 20 to the direct current by the full-bridge inverter 30. Then the direct current is step-down and goes through the back current prevention unit 60 and the selective switch unit 80 to wireless charge the handheld device and the loading and achieve the purpose of wireless charging. Thus, the bypass control bidirectional wireless charging device includes bidirectional charging mode. While the discharging mode is adopted, the transmitting power is provided by the battery or the external power. While the charging mode is adopted, the handheld device and the loading are charged by the wireless charging power. Therefore, the purpose of bidirectional wireless charging is achieved.

Furthermore, the back current prevention unit 60 further comprises a first transistor 64, a second transistor 65, a third resistance 66, a first bipolar junction transistor 67 and a fourth resistance 68. Both of the first transistor 64 and the second transistor 65 have a drain terminal 641, 651, a source terminal 642, 652 and a gate terminal 643, 653. One end of the third resistance 66 electrically connects to the source terminal 642 of the first transistor 64 and the source terminal 652 of the second transistor 65, and the other end of the third resistance 66 electrically connects to the bipolar junction transistor 67 and the gate terminal 643 of the first transistor 64 and the gate terminal 653 of the second transistor 65. The first bipolar junction transistor 67 comprises a collecting terminal 672, an emitter terminal 673 and a base terminal 671, wherein the collecting terminal 672 connects to the other end of the third resistance 66 electrically and the emitter terminal 673 is grounding. The base terminal 671 electrically connects to the logic control unit 10 across the fourth resistance 68, wherein each of the first transistor 64 and the second transistor 65 is a metal oxide semiconductor field effect transistor.

The discharging switch unit 50 comprises a third transistor 54, a fourth transistor 55, a fifth resistance 56, a sixth resistance 58, a second bipolar junction transistor 57, and both of the third transistor 54 and the fourth transistor 55 have a drain terminal 541, 551, a source terminal 542, 552 and a gate terminal 543, 553. One end of the fifth resistance 56 electrically connects to the source terminal 542 of the third transistor 54 and the source terminal 552 of the fourth transistor 55, and the other end of the fifth resistance 56 electrically connects to the second bipolar junction transistor 57 and the gate terminal 543 of the third transistor 54 and the gate terminal 553 of the fourth transistor 55. The second bipolar junction transistor 57 comprises a collecting terminal 572, an emitter terminal 573 and a base terminal 571, wherein the collecting terminal 572 electrically connects to the other end of the fifth resistance 56 and the emitter terminal 573 is grounding. The base terminal 571 electrically connects to the signal terminal 502 across the sixth resistance 58, wherein each of the third transistor 54 and the fourth transistor 55 is a metal oxide semiconductor field effect transistor.

The buck-boost unit 40 comprises an inductor 41, a fifth transistor 42, a sixth transistor 43 and a capacitor 44, wherein one end of the inductor 41 electrically connects to the back current prevention unit 60 and the discharging switch unit 50 and the other end of the inductor 41 electrically connects to the fifth transistor 42 and the sixth transistor 43 therebetween. The fifth transistor 42 has a drain terminal 421, a source terminal 422, and a gate terminal 423. The sixth transistor 43 has a drain terminal 431, a source terminal 432 and a gate terminal 433. The source terminal 422 of the fifth transistor 42 electrically connects to the drain terminal 431 of the sixth transistor 43, and the drain terminal 421 of the fifth transistor 42 electrically connects to one end of the capacitor 44 and the full-bridge inverter 30. The other end of the capacitor 44 is grounding. Each of the fifth transistor 42 and the sixth transistor 43 is a metal oxide semiconductor field effect transistor.

The full-bridge inverter 30 comprises a first pin 31, a second pin 32, a third pin 33 and a fourth pin 34, wherein the first pin 31 electrically connects to the buck-boost unit 40, and the second pin 32 and the fourth pin 34 electrically connects to the wireless transmission unit 20, and the third pin 33 is grounding. The full-bridge inverter 30 further comprises a seventh transistor 35, an eighth transistor 36, a ninth transistor 37 and a tenth transistor 38, and each of the seventh transistor 35, the eighth transistor 36, the ninth transistor 37 and the tenth transistor 38 has a gate terminal 351, 361, 371, 381 which electrically connects to the logic control unit 10, wherein each of the seventh transistor 35, the eighth transistor 36, the ninth transistor 37 and the tenth transistor 38 is a metal oxide semiconductor field effect transistor.

The selective switch unit 80 comprises a eleventh transistor 81, a twelfth transistor 82, a seventh resistance 83, an eighth resistance 84 and a third bipolar junction transistor 85, wherein each of the eleventh transistor 81 and the twelfth transistor 82 has a drain terminal 811, 821, a source terminal 812, 822 and a gate terminal 813, 823, one end of the seventh resistance 83 electrically connects to the source terminal 812, 823 of the eleventh transistor 81 and the twelfth transistor 82, and the other end of the seventh resistance 83 electrically connects to the gate terminal 813, 823 of the eleventh transistor 81 and the twelfth transistor 82 and the third bipolar junction transistor 85, and the third bipolar junction transistor 85 has a base terminal 851, a collector terminal 852 and an emitter terminal 853, and the collector terminal 852 electrically connects to the other end of the seventh resistance 83 and the emitter terminal 853 is grounding, and the base terminal 851 electrically connects to the selective control terminal 802 across a eighth resistance 84. Each of the eleventh transistor 81 and the twelfth transistor 82 is a metal oxide semiconductor field effect transistor. Furthermore, the selective output terminal 801 of the selective switch unit 80 connects to a loading; wherein the loading is selected from a group consist of a handheld device, a notebook, a tablet PC, a mobile power source, and a GPS navigation device.

The logic control unit 10 comprises a detective terminal 101, a digital signal control terminal 102, a back current prevention signal terminal 103, a transmitter maintain terminal 104, a transmitting identifying terminal 105, a first pulse width modulation control terminal 106, a second pulse width modulation control terminal 107, a first control terminal 108, a second control terminal 109, a third control terminal 110, a fourth control terminal 111, a voltage terminal 112 and a transmitting signal terminal 113, wherein the detective terminal 101 electrically connects to one end of the first resistance 611 and one end of the second resistance 613, and the digital signal control terminal 102 electrically connects to the signal terminal 502 across a second diode 532. The back current prevention signal terminal 103 electrically connects to the control terminal 602 of the back current prevention unit 60, and the transmitter maintain terminal 104 electrically connects to the signal terminal 502 of the discharging switch unit 50 across a third diode 533. The transmitting identifying terminal 105 electrically connects to the signal terminal 502 of the discharging switch unit 50 across a ninth resistance 534, and the first pulse width modulation control terminal 106 and the second pulse width modulation control terminal 107 electrically connects to the buck-boost unit 40. The first control terminal 108, the second control terminal 109, the third control terminal 110 and the fourth control terminal 111 electrically connects to the full-bridge inverter 30 sequentially and the voltage terminal 112 electrically connects to the full-bridge inverter 30 and the buck-boost unit 40 therebetween, and the transmitting signal terminal 113 electrically connects to the wireless transmission unit 20. The selective control terminal 114 electrically connects to the selective switch unit 80.

The transmitting mode which is provided by the bypass control bidirectional wireless charging device of present invention includes a battery transmitting mode and a transmitting power supply mode. The transmitting power supply mode is adopted while connects to an external power source and departed from the power supplied by the battery 70. On the contrary, the battery transmitting mode is adopted while the external power source is not detected, and the battery 70 provides the transmitting power for the wireless transmission unit 20.

While the battery transmitting mode is adopted, the discharging switch unit 50 is switched by pressing the switch 53 or by sending a signal from the back current prevention signal terminal 103 of the logic control unit 10. When the switch 53 is pressed to switch the discharging switch unit 50 into battery transmitting mode that is identified by the logic control unit 10, the discharging switch unit 50 is electrify and connects to the voltage terminal 112 of the logic control unit 10 across the fifth transistor 42 of the buck-boost unit 40 to provide electric power to the logic control unit 10.

When the battery transmitting mode is identified by the logic control unit 10, the battery transmitting mode is kept by the transmitter maintain terminal 104 of the logic control unit 10 which is controlled by the third diode 533, and continuously provides the transmitting signal to the transmitting identifying terminal 105 to keeps in the transmitting state.

The transmitting signal terminal 113 of the logic control unit 10 detects whether a electronics is exist or not for charging on the opposite side of the wireless transmission unit 20 with an antenna. If the electronics is not detected, the logic control unit 10 stops transmitting. The detection is to detect whether a loading is exist or not at the opposite side of the wireless transmission unit 20 by the transmitting signal terminal 113. The wireless transmission unit 20 stops transmitting without the loading. If the wireless transmission unit 20 detects the loading, the logic control unit 10 sends a signal from the first pulse width modulation control terminal 106 and the second pulse width modulation control terminal 107 to switch on the fifth transistor 42 and the sixth transistor 43 of the buck-boost unit 40. The fifth transistors 42 and the six transistors 43 continuously switches the ON/OFF state at a high frequency by the signal which is sent from the first pulse width modulation control terminal 106 and the second pulse width modulation control terminal 107. When the fifth transistors 42 turns off and the six transistors and 43 turns on, the electricity of the battery 70 goes through the discharging switch unit 50, the inductor 41 of the buck-boost unit 40, and the sixth transistor 43 to charge the inductor 41 since one end of the six transistor 43 and the battery 70 are grounding and forms a circuit loop. When the fifth transistors 42 turns on and the six transistors 43 and turns off, the electricity of the battery 70 goes through the inductor 41 and the fifth transistor 42 to discharge the inductor 41, and sends direct current to the capacitor 44. The direct current is a current which is synchronous rectified and boosted, and transforms into alternating current by the full-bridge inverter 30 to provide the alternating current to the wireless charging unit 20 to generate the transmitting power.

In other words, the inductor 41 is charged by the switching of the fifth transistor 42 and the six transistors 43. In order to achieve the purpose of wireless charging, the direct current is synchronous rectified and boosted which is stored in the capacitor 44, and the direct current is transformed into alternating current by the full-bridge inverter 30 to provide the alternating current to the wireless charging unit 20 to generate the transmitting power which is received by the electronics at the opposite side.

While the transmitting power supply mode is adopted, the charging terminal 612 of the back current prevention unit 60 electrically connects to the external power and the detective terminal 101 of the logic control unit 10 detects the external power to switch the bypass control bidirectional wireless charging device of present invention into the transmitting power supply mode. Now the digital signal control terminal 102 of the logic control unit 10 sends a signal to turn off the discharging switch unit 50 for preventing the discharging of the battery, and turn on the back current prevention unit 60 to provide the electric power of the external power to the buck-boost unit 40, wherein the electric power of the external power is synchronously boosted and rectified by the buck-boost unit 40, and then transforms the direct current into the alternating current by the full-bridge inverter 30 to provide the alternating current to the wireless transmission unit 20 to generate the transmitting power.

The inductor 41 is charged by the switching of the fifth transistor 42 and the six transistors 43. In order to achieve the purpose of wireless charging, the direct current is synchronous rectified and boosted which is stored in the capacitor 44, and the direct current is transformed into alternating current by the full-bridge inverter 30 to provide the alternating current to the wireless charging unit 20 to generate the transmitting power which is received by the electronics at the opposite side.

While the bypass control bidirectional wireless charging device of present invention adopts the charging mode (receive power), the charging terminal 612 of the back current prevention 60 further connects to a handheld device. If the transmitting power is provided at the opposite side of the wireless transmission unit 20, the transmitting signal terminal 113 sends a signal to switch the wireless transmission unit 20 into the charging mode (receive power). The transmitting power received by the wireless transmission unit 20 is transformed into direct current by the full-bridge inverter 30. Then the direct current is step-down by the buck-boost unit 40 to achieve the purpose of charging the handheld device by wireless charging.

The selective output terminal 801 of the selective switch 80 further connects to a loading (not shown in the Figure). While the charging mode (receive power) is adopted, the power received by the wireless transmission unit 20 transforms into direct current by the full-bridge inverter 30. Then the direct current is step-down by the buck-boost unit 40 to achieve the purpose of charging the loading wireless charging.

Furthermore, while the bypass control bidirectional wireless charging device of present invention adopts the charging mode (receive power), the logic control unit 10 operates with the back current prevention unit 60 and the selective switch unit 80 which provides the control modes are summarized as follow: 1. While the back current prevention unit 60 and the selective switch unit 80 turn on, the electric power received by the wireless transmission unit 20 is provided to charge the handheld device and the selective output terminal 801 of the selective switch unit 80. 2. While the back current prevention 60 turns on and the selective switch unit 80 turns off, the electric power received by the wireless transmission unit 20 is provided to charge the handheld device without providing the power to the selective output terminal 801 of the selective switch unit 80. 3. While the back current prevention 60 and the selective switch unit 80 turn off, the electric power received by the wireless transmission unit 20 is not provided to charge the handheld device and the selective output terminal 801 of the selective switch unit 80. 4. While the back current prevention 60 turns off and the selective switch unit 80 turn on, the electric power received by the wireless transmission unit 20 is provided to the selective output terminal 801 of the selective switch unit 80.

The features of present invention which has been described above are summarized as follows: 1. The bypass control bidirectional wireless charging device of present invention Increases the effective duration of the battery. 2. The bypass control bidirectional wireless charging device of present invention increases the electricity efficiency. 3. While the bypass control bidirectional wireless charging device of present invention adopts the charging mode (receive power), it charges the loading connects to the selective switch unit and the handheld device connects to the back current prevention unit simultaneously. 4. The bypass control bidirectional wireless charging device of present invention includes charging mode and discharging mode for using in one to one or one to several electronics to conduct wireless charging/discharging. 5. The bypass control bidirectional wireless charging device of present invention is applied to all electronic products.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A bypass control bidirectional wireless charging device, comprising:
   a logic control unit;
   a wireless transmission unit, electrically connecting to the logic control unit;
   a full-bridge inverter, electrically connecting to the logic control unit and the wireless transmission unit;
   a buck-boost unit, electrically connecting to the full-bridge inverter and the logic control unit;
   a discharging switch unit, having a battery terminal, a signal terminal, and output terminal, wherein the signal terminal electrically connecting to the logic control unit and the output terminal electrically connecting to the buck-boost unit;
   a battery, electrically connecting to the battery terminal of the discharging switch unit;
   a switch, electrically connecting to the battery terminal with one end thereof, and the other end of the switch electrically connecting to the signal terminal across a first diode;
   a back current prevention unit, having a inlet terminal, a outlet terminal and a control terminal, wherein the inlet terminal electrically connecting to one end of a first resistance and a charging terminal, the other end of the first resistance electrically connecting to the logic control unit and one end of a second resistance and the other end of the second resistance is grounding, the outlet terminal electrically connecting to the discharging switch unit and the buck-boost unit therebetween, and the control terminal electrically connecting to the logic control unit; and
   a selective switch unit, having a selective connecting terminal, a selective output terminal, and a selective control terminal, wherein the selective connecting terminal electrically connecting to the outlet terminal of the back current prevention unit, the output terminal of the discharging switch unit, and the buck-boost unit, and the selective control terminal electrically connecting to the logic control unit.

2. The bypass control bidirectional wireless charging device as claimed in claim 1, wherein the back current prevention unit further comprising a first transistor, a second transistor, a third resistance, a first bipolar junction transistor and a fourth resistance, each of the first transistor and the second transistor having a drain terminal, a source terminal and a gate terminal, one end of the third resistance electrically connecting to the source terminal both of the first transistor and the second transistor, and the other end of the third resistance electrically connecting to the bipolar junction transistor and gate terminal both of the first transistor and the second transistor, and the first bipolar junction transistor comprising a collecting terminal, an emitter terminal and a base terminal, and the other end of the third resistance electrically connecting to the collecting terminal, the emitter terminal is grounding, the base terminal electrically connecting to the logic control unit across the fourth resistance.

3. The bypass control bidirectional wireless charging device as claimed in claim 2, wherein each of the first transistor and the second transistor is a metal oxide semiconductor field effect transistor respectively.

4. The bypass control bidirectional wireless charging device as claimed in claim 1, wherein the discharging switch unit further comprising a third transistor, a fourth transistor, a fifth resistance, a sixth resistance, a second bipolar junction transistor, and each of the third transistor and the fourth transistor having a drain terminal, a source terminal and a gate terminal, one end of the fifth resistance electrically connecting to the source terminal of the third transistor and the fourth transistor, and the other end of the fifth resistance electrically connecting to the second bipolar junction transistor and the gate terminal of the third transistor and the fourth transistor, and the second bipolar junction transistor comprising a collecting terminal, a emitter terminal and a base terminal, and the collecting terminal electrically connecting to the other end of the fifth resistance, the emitter terminal is grounding, the base terminal electrically connecting to the signal terminal across the sixth resistance.

5. The bypass control bidirectional wireless charging device as claimed in claim 4, wherein each of the third transistor and the fourth transistor is a metal oxide semiconductor field effect transistor respectively.

6. The bypass control bidirectional wireless charging device as claimed in claim 1, wherein the buck-boost unit comprising an inductor, a fifth transistor, a sixth transistor and a capacitor, and one end of the inductor electrically connecting to the back current prevention unit and the discharging switch unit, and the other end of the inductor electrically connecting to the fifth transistor and the sixth transistor therebetween, and each of the fifth transistor and the sixth transistor having a drain terminal, a source terminal and a gate terminal, the source terminal of the fifth transistor electrically connecting to the drain terminal of the sixth transistor, and the drain terminal of the fifth transistor electrically connecting to one end of the capacitor and the full-bridge inverter, and the other end of the capacitor is grounding.

7. The bypass control bidirectional wireless charging device as claimed in claim 6, wherein each of the fifth transistor and the sixth transistor is a metal oxide semiconductor field effect transistor.

8. The bypass control bidirectional wireless charging device as claimed in claim 1, wherein the full-bridge inverter comprising a first pin, a second pin, a third pin and a fourth pin, wherein the first pin electrically connecting to the buck-boost unit, and the second pin and the fourth pin electrically connecting to the wireless transmission unit, and the third pin is grounding.

9. The bypass control bidirectional wireless charging device as claimed in claim 8, wherein the full-bridge inverter further comprising a seventh transistor, an eighth transistor, a ninth transistor and a tenth transistor, and each of the seventh transistor, the eighth transistor, the ninth transistor and the tenth transistor having a gate terminal in which electrically connecting to the logic control unit.

10. The bypass control bidirectional wireless charging device as claimed in claim 9, wherein each of the seventh transistor, the eighth transistor, the ninth transistor and the tenth transistor is a metal oxide semiconductor field effect transistor.

11. The bypass control bidirectional wireless charging device as claimed in claim 1, wherein the selective switch unit further comprising a eleventh transistor, a twelfth transistor, a seventh resistance, an eighth resistance and a third bipolar junction transistor, wherein each of the eleventh transistor and the twelfth transistor having a drain terminal, a source terminal and a gate terminal, one end of the seventh resistance electrically connecting to the source terminal of the eleventh transistor and the twelfth transistor, and the other end of the seventh resistance electrically connecting to the gate terminal of the eleventh transistor and the twelfth transistor and the third bipolar junction transistor, and the third bipolar junction transistor having a base terminal, a collector terminal and an emitter terminal, and the collector terminal electrically connecting to the other end of the seventh resistance and the emitter terminal is grounding, and the base terminal electrically connecting to the selective control terminal across a eighth resistance.

12. The bypass control bidirectional wireless charging device as claimed in claim 1, wherein each of the eleventh transistor and the twelfth transistor is a metal oxide semiconductor field effect transistor.

13. The bypass control bidirectional wireless charging device as claimed in claim 1, wherein the logic control unit comprising a detective terminal, a digital signal control terminal, a back current prevention signal terminal, a transmitter maintain terminal, a transmitting identifying terminal, a first pulse width modulation control terminal, a second pulse width modulation control terminal, a first control terminal, a second control terminal, a third control terminal, a fourth control terminal, a voltage terminal, a transmitting signal terminal, and a selective signal control terminal, wherein the detective terminal electrically connecting to each end of the first resistance and the second resistance, and the digital signal control terminal electrically connecting to the signal terminal across a second diode, and the back current prevention signal terminal electrically connecting to the control terminal of the back current prevention unit, and the transmitter maintain terminal electrically connecting to the signal terminal of the discharging switch unit across a third diode, and the transmitting identifying terminal electrically connecting to the signal terminal of the discharging switch unit across a ninth resistance, and the first pulse width modulation control terminal and second pulse width modulation control terminal electrically connecting to the buck-boost unit, and the first control terminal, the second control terminal, the third control terminal and the fourth control terminal electrically connecting to the full-bridge inverter sequentially, and the voltage terminal electrically connecting to the full-bridge inverter and the buck-boost unit therebetween, and the transmitting signal terminal electrically connecting to the wireless transmission unit, and the selective signal control terminal electrically connecting to the selective switch unit.

14. The bypass control bidirectional wireless charging device as claimed in claim 1, wherein the charging terminal of the back current prevention unit further electrically connecting to an external power.

15. The bypass control bidirectional wireless charging device as claimed in claim 1, wherein the charging terminal of the back current prevention unit further electrically connecting to a handheld device.

16. The bypass control bidirectional wireless charging device as claimed in claim 1, wherein the switch is an automatic self-reset switch.

17. The bypass control bidirectional wireless charging device as claimed in claim 1, wherein the selective output terminal of the selective switch unit further connecting to a loading.

18. The bypass control bidirectional wireless charging device as claimed in claim 1, wherein the loading is selected from a group consist of a handheld device, a notebook, a tablet PC, a mobile power source, and a GPS navigation device.

\* \* \* \* \*